Nov. 16, 1965    T. B. WAYNE    3,217,769
APPARATUS FOR MILLING CEREAL GRAINS
Original Filed May 4, 1961    2 Sheets-Sheet 1
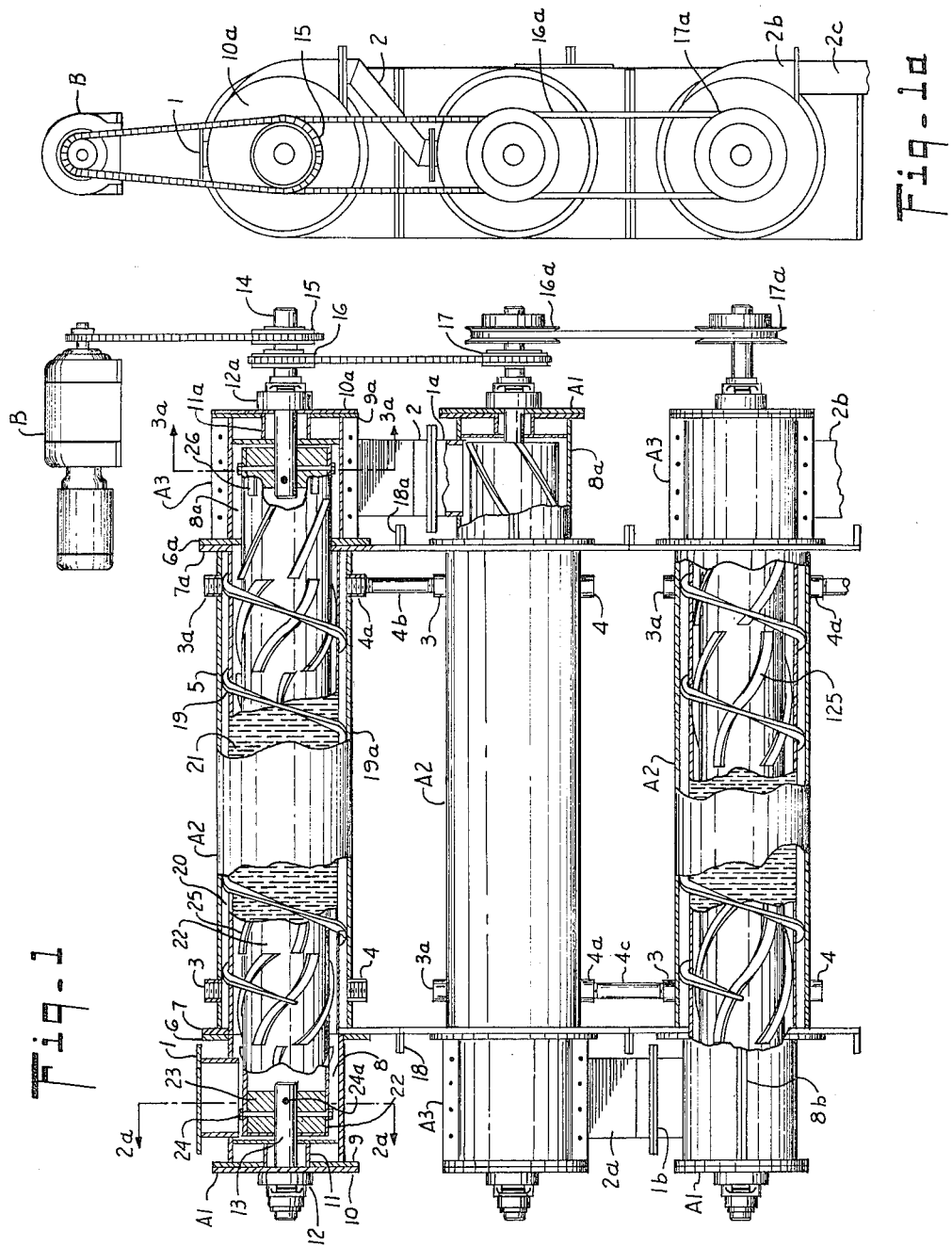
INVENTOR.
TRUMAN B. WAYNE
BY Browning, Simms,
Dyer & Eickenroht
ATTORNEY

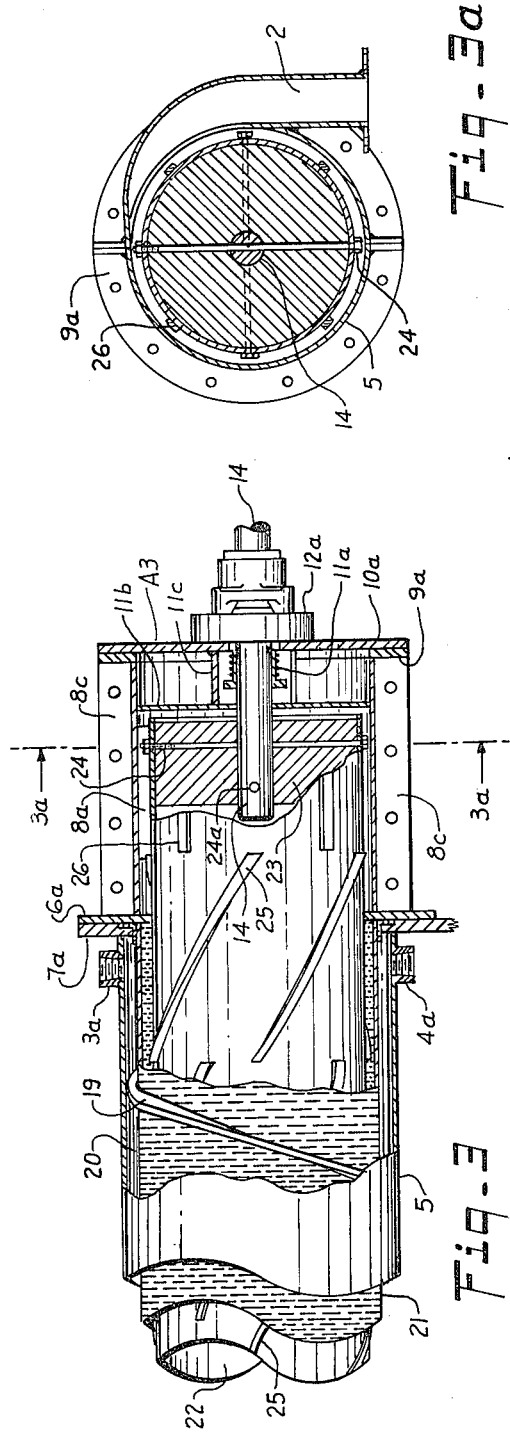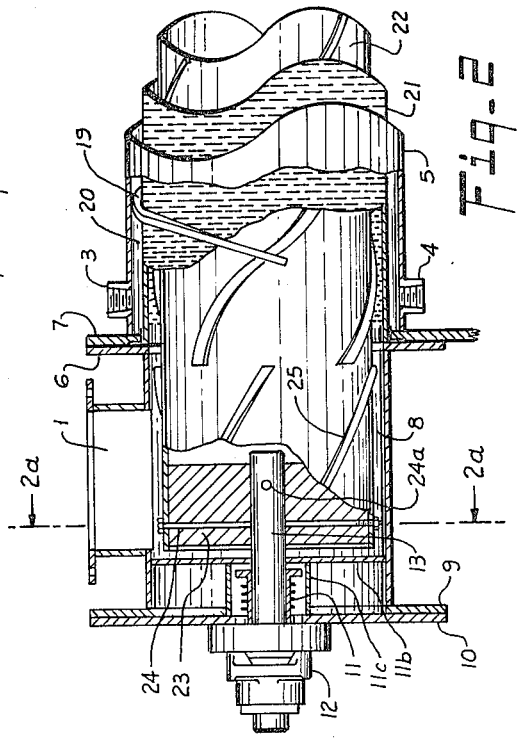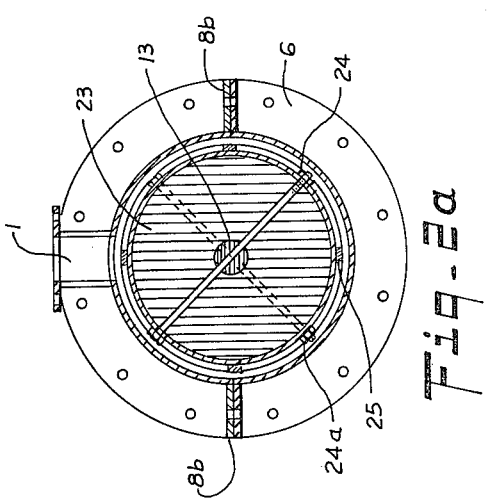

United States Patent Office 3,217,769
Patented Nov. 16, 1965

1

3,217,769
APPARATUS FOR MILLING CEREAL GRAINS
Truman B. Wayne, P.O. Box 13086, Houston, Tex.
Original application May 4, 1961, Ser. No. 107,505. Divided and this application Aug. 12, 1963, Ser. No. 301,492
8 Claims. (Cl. 146—279)

This invention relates to an apparatus for accomplishing solvent extraction and milling and which is suitable for continuous or batch processing of cereal grains which are solvent extracted to remove fats and simultaneously subjected to a milling action on the outer bran layers and germ of the grains' pericarps. This application is a division of my co-pending application Serial No. 107,505, filed May 4, 1961.

Rice in any of its numerous varieties which fall within the three common commercial classifications as short, medium and long grained varieties in the main cereal grain suitable for processing in the subject apparatus, although barley may also be similarly processed to produce a novel product which differs from the usual "pearled" barley of commerce. The apparatus as herein described, or an obvious modification thereof may be suited to other grains and oil-bearing seeds which are characterized by a removable husk or hull which when removed by suitable means exposes a germ and pericarp which may be removed by milling without substantial degradation of the kernel.

In the conventional rice milling process of commerce the rough, or paddy, rice is first cleaned of dirt, straw and other debris and is then sent to stone shellers which remove the hulls and most of the loosely adhering bran within the hull enclosure and surrounding the more adherent bran layers over the endosperm. The hulled, brown rice is then milled in machines having the misnomer of "hullers." Actually, these machines consist essentially of a horizontal, cylindrical shell having perforations against which the rice is rubbed by a rapidly revolving inner core having a ribbed surface. This surface grinding operation is carried out under time and feed rate conditions which will produce the desired degree of removal of the outer bran layers from the rice kernel. This rather severe milling process breaks a substantial proportion of the whole rice grains into two or more fragments, this breakage being due to a combination of effects such as physical impact, thermal and mechanical stresses and generated heat. The loss of whole, head rice kernels varies with the variety, state of curing, handling in the rice dryer and subsequent storage and the severity of milling. This breakage results in a serious economic loss, as broken rice brings only about half the price of the whole head rice.

The apparatus used in present day rice milling practices was developed many years ago and has continued in use since then without substantial modification. As used in rice mills, it is driven at constant speed and has a fixed clearance between the ribbed, horizontally placed rotor and the imperforate upper half; and of more importance, also the perforated screen lower half of the outer cylindrical enclosure for the said rotor. Arranged laterally on one side of the outer enclosure was a slot through which a bar was inserted and which by means of an adjusting screw and guide arrangement could be held firmly while being moved inward or outward to adjust the clearance between the inner edge of this bar and the ribbed rotor. This provided a choking action at this point which increased the degree of agitation and friction between the rice kernels and the revolving and stationary machine parts when the aperture was restricted, and resulted in more severe milling and consequently an

2 increase in the degree of breakage of the rice kernels. Further control of the degree of milling could also be obtained independently or in combination with the effect of the choke bar by restricting the outlet through which the rice passed when leaving the machine. Since the rotor was equipped with positive acting lead-in flights at the feed end, any restriction of the flow of rice either within the annulus between the rotor and its casing by means of the choke bar, or by restriction of the outlet, greatly increased the pressure on the rice and resulted in increased scouring action, heat generation and breakage.

An object of the invention is to provide improved milling equipment for rice which will considerably reduce the amount of breakage and consequently increase the yields of the premium grade head milled rice.

Another object is to provide simultaneously with milling a solvent extraction apparatus which will aid in the milling operation and also remove fats and oils present in the bran coat and residual endosperm which readily undergo oxidation and spoilage when present either in the removed bran or in the milled rice.

Further objects will appear from the detailed description taken in connection with the accompanying drawings of an illustative embodiment of this invention; it is to be understood, however, that this invention is susceptible of various embodiments within the appended claims.

In the drawings:

FIGS. 1 and 1a are elevation and end views, respectively, of a complete assembly of one embodiment of this invention;

FIGS. 2 and 2a illustrate the construction details in section at the receiving end of each unit, FIG. 2a being a section on the line 2a—2a of FIGS. 1 and 2; and FIGS. 3 and 3a illustrate the construction details in section at the discharge end of each unit, FIG. 3a being a section on the line 3a—3a of FIGS. 1 and 3.

FIGS. 1 and 1a illustrate a process and an apparatus illustrating a horizontal, end-driven milling apparatus together with its tandem, variable speed drive. Three units are shown arranged in series to mill and convey the grain through the upper unit, next through the middle unit and finally through the third or lowest unit from which it is discharged to a succeeding process apparatus. Circulating through the series of units in either concurrent or countercurrent flow is an extractive solvent for the fatty constituents of the cereal product. Several alternate flow patterns for the solvent are contemplated, as will be later described. Each milling unit in the series is a complete, identical apparatus which when erected as illustrated in the above-referenced drawings comprises the three-unit assembly in which the second unit is opposite hand from the first and third units, the differences being the hand of the spirally arranged flights on the horizontal rotor, in the location of the horizontally placed flights in the discharge end and the connections for the solvent intake and discharge piping. In any such arrangement of two or more units in superimposed arrangement for continuous processing, the odd numbered units convey in a direction opposite from the even numbered units, and the conveying mechanism is of opposite hand.

Reference is made herein to bran softening agents used in pretreatment of the brown rice before either dry milling or wet milling with extractive solvents, and also to the use of extractive solvents such as are disclosed in applicant's co-pending applications, Serial Numbers 43,-351 and 81,969. Suitable bran softening agents may be a vegetable oil such as the rice oil extracted as described in the above-referenced applications, or any other vegetable oil such as cottonseed oil, corn oil which in their refined states are known as edible oils suitable for human consumption. Highly refined mineral oils are also suitable when used in the small proportions contemplated in the present and above-referenced applications. Other approved oil-soluble or oil-emulsifiable substances such as food humectants, emulsifiers, etc., for instance, propylene glycol and fatty acid esters thereof, sorbitol, citric acid and various non-toxic hydroxy, carboxy and amido compounds which will wet and penetrate the somewhat oily bran layers, may be used either with or without solvent extraction. Suitable extractive solvents are alcohols, ethers, petroleum hydrocarbons such as hexane, heptane, etc., and the various chlorinated hydrocarbons such as ethylene dichloride, dichlorethyl ether, trichlorethylene and others which are characterized by their ability to extract the fatty components from the germ and the bran coat.

Each unit comprises triplicate assembly units A1, A2 and A3 which are respectively the feeder, milling and conveying, and the discharge sections. The discharge section of each preceding unit is connected to the feeder section of the unit which follows it, with the discharge section of the final unit connected to a succeeding apparatus in the process sequence. As previously explained above, the sequence of these assembly components for each unit is reversed between odd and even numbered units of an assembly of two or more units.

Referring to FIGS. 1 and 1a, numbers 1, 1a and 1b refer to the receiving or inlet chutes; 2, 2a and 2b to the outlet chutes; while 2c refers to an outlet chute to a succeeding apparatus, not shown, the outlet 2 from one unit to the next unit may be as shown in FIGS. 1 and 3a. Threaded pipe couplings, or alternately flanged pipe nipples 3, 3a, 4 and 4a are provided identically top and bottom welded to the outer shell 5 of section A2 of each unit, and are piped to 4b and 4c to provide the desired concurrent, countercurrent or mixed flow pattern of the solvent medium through the apparatus. The flow may be sequential from one unit to the other or, depending on processing procedures may originate from, or discharge to other apparatus in the process; for example, as disclosed in applicant's co-pending applications Serial Numbers 43,351, filed July 18, 1960, and 81,969, filed January 11, 1961. Unused pipe connections are closed with suitable pipe plugs or valving arrangement.

Subassembly components A1 and A3 are each joined to the extraction milling and conveying section A2 by means of their flanges 6 and 6a which join flanges 7 and 7a at the ends of the upper section. At each end is a split tubular section 8 and 8a which is connected by flanges 8b and 8c, FIGS. 1, 2a and 3, to which are attached flanges 9 and 9a which in turn are bolted to flanged ends 10 and 10a which support and align shaft seals 11 and 11a and shaft seal housing 11b and 11c and also antifriction bearings 12 and 12a through which end shaft 13 and drive shaft 14 revolve. Driven sprocket 15 is keyed to drive shaft 14 and is driven by means of a chain from a suitable motor drive unit B which furnishes the necessary r.p.m. and horsepower to operate the number of units in the assembly. Drive sprockets 16 and 16a and driven sprockets 17 and 17a with their chains complete the drive assembly.

Each unit assembly is supported by foot extensions of flanges 7 and 7a of the milling and conveying section A2 which terminate in angles 18 and 18a, respectively. These angles may be bolted to extensions in reversed position of their corresponding flanges on the next succeeding unit, or may be supported on an independent structure. This reorientation at 180° of flanges on the milling and conveying section A2 may be made since bolt hole spacings on these and matching flanges are in identical circular pattern.

Each of the milling and conveying sections A2 comprises an outer cylindrical casing 5 to which are welded the flanges 7 and 7a. Wound and welded within the casing is ribbon spiral 19 which is tack welded to outer casing 5. This spiral acts as a baffle within an annulus 20 which lies between the outer casing 5 and a perforated inner cylinder 21, and the baffle is also a support for cylinder 21 which fits within the inside diameter of spiral baffle 19. The baffle 19 is notched at its lowest points, FIG. 1, at 19a to allow complete drainage of casing 5 and also to insure the flushing out of millings which may settle to the bottom of the casing.

Inner cylinder 21 is fabricated of perforated metal or heavy wire mesh cloth which has perforations or open mesh areas which are too small to pass a cereal grain, oil-bearing seed or any fragment thereof which exceeds 0.050 inch in its smallest dimension, but which will present a roughened surface having openings through which the solvent stream and millings will freely pass. The texture of the perforated or woven wire cloth surface may be varied to suit the degree of milling in each successive screw; thus, the first screw may make a coarse cut into the bran layer and the others may successively make finer cuts which tend to polish the milled cereal grains. Rectangular or oblong slots of various lengths may be employed where the width of the slot does not exceed 0.050 inch. The preferred slots are oblong or rectangular ranging from 0.024 inch to 0.049 inch in width and from ⅛-inch to ½-inch long in side stagger arrangement on from ⅛-inch to ¹¹⁄₁₆-inch centers. Such perforated sheet metals are ordinarily articles of commerce and are readily available in a wide variety of perforations. Other hole perforation shapes such as round or square, and in arrangements other than side stagger are also contemplated, although preferred types have been described above. An advantage of the oblong and rectangular slots is that they are not plugged when a grain of rice enters them endwise.

Likewise, where wire mesh screen cloth is used, preference is given to weaves having rectangular openings comprising from 28 to 55 percent of their area, and in which the weave forms openings which do not exceed 0.050 inch in their narrow dimension which corresponds to the slot widths above described.

A horizontally placed rotor comprises a cylinder 22 of smaller diameter than its surrounding perforate cylinder 21 and having spiral ribs 25 and longitudinal discharge flights 26. Cylinder 22 is supported by the end shaft 13 and drive shaft 14 and held at accurate concentric distance from surrounding cylinder 21 so that it may rotate freely at uniform clearance from the latter throughout its length. This rotor component may be fabricated from large diameter solid shafting, may be cast and machined, or from the standpoints of cost and weight may be fabricated from steel pipe. If fabricated from pipe, as illustrated in the drawings, there is inserted in each end a closely fitted piece of cylindrical metal 23 which has been drilled and keyed to provide a close fit around shafts 13 or 14, Also, piece 23 is drilled through to coincide with holes in outer pipe shell 22 and shaft 13 or 14 to receive two bolts 24 and 24a inserted through shaft 13 or 14, outer shell 22 and piece 23 to secure the assembly. If the cylindrical rotor component 22 is fabricated from solid shafting, or is cast and machined, in either case cylindrical metal piece 23 is eliminated, but bolts 24 and 24a or an equivalent means of securing shafts 13 and 14 into solid shaft 22 is employed. This will allow ready dismantling of either end section assembly A1 or A3 by first removing bolts 24 and 24a, and after removing the bolts through assembled flanges 9 and 10 or 9a and 10a pulling the entire end assembly comprising the bearing, shaft, mechanical seal, mechanical seal housing and flange.

The large diameter, cylindrical rotor part 22, whether fabricated from pipe or solid shafting, is provided with the series of spirally placed ribs or lifter flights 25 arranged to extend around the circumference of the cylindrical part for any convenient distance ranging between 45° and 180° after which their continuity is interrupted by a following set of ribs or lifter flights which begin roughly coincident vertically with, and spaced substantially midway in a generally sloping plane between the termini of the preceding set. This pattern of interrupted parallel wound flight segments, which continue for a distance of from 45° to 180° around the cylindrical part before yielding to a succeeding set, begins under receiving spout 1 of section A1 and continues into the discharge section A3 and terminates near the discharge chute where it is replaced by a series of horizontally placed ribs or discharge flights 26 which are placed in like pattern and number corresponding to the preceding sets of spirally wound lifter flights. The latter receive the grain from the last set of spirally wound flights and carries it upward and out through discharge chute 2. In similar manner but opposite hand are arranged the series of lifter flights and discharge flights on the even numbered units of an assembly of two or more units.

The drawings illustrate the use of lifter flights spirally wound in parallel sets of four in which each spiral continues as a helical spiral for 90° around the shaft before interrupted. The succeeding set of four spirals begins where the preceding set is interrupted, but each spiral begins midway, or 45°, between a preceding pair. These spiral flights have approximately rectangular cross sections with slightly beveled edges. It is to be understood, however, that the spiral flights may be arranged to continue for shorter distances around the large diameter, cylindrical base, or for longer distances than 90°, such as 120° or even 180°, before being interrupted. Defined in terms of pitch diameter in relationship to over-all diameter of the rotor, inclusive of flights, it may be said that the 45° spirals have a pitch diameter to over-all diameter ratio of 1:1, and that this ratio may be as wide as 4:1 for spirals wound for 180° around the rotor base before being interrupted. Thus a 4-inch over-all diameter rotor would for 45° wound flights have a pitch diameter between corresponding flights of adjacent interrupted sets of 4 inches, hence a ratio of 1:1. For 90° wound flights the ratio of pitch diameter to over-all diameter would be 2:1, and for 180° wound flights, 4:1. Such measurements of pitch diameter are made from the corresponding high points on two successive helixes in the same plane.

Interrupted flights provide better mixing and turning of the grain while abrading its surfaces between the stationary cylindrical screen 21 and the spirally ribbed rotor 22 during the forward progress of the grain toward the discharge end.

The effective clearance between ribs 25 and perforate screen 21 may be varied between the two or more units in any series milling assembly to suit any desired plan, but the range is usually between a maximum of 9/16 inch and a minimum of 3/16 inch. With the longer travel of the rice provided in each unit than is available in the conventional huller, the milling action may be less drastic and of longer duration with consequent reduction is breakage losses. It is also possible to increase or decrease the milling pressure within any unit of a series by varying the rotor speed in a succeeding unit which will retard or increase the pressure within said preceding unit.

With reference to the drawings above described it will be understood that the less the pitch diameter between successive flight helixes in the same horizontal plane at any given speed, the faster will be the travel of the grain through the extraction milling section A2. The choice of flight pitch diameters will be governed the varietal characteristics of the grain and the degree of milling desired. Following a unit having helixes of relatively short pitch diameter with a unit having longer pitch diameter as indicated at 125 will lengthen the retention time in the preceding unit and increase the degree of milling in the same general manner that the use of slower r.p.m. in a following unit which has an identical rotor to that in the preceding unit will have like effects. In fact, either method allows effective milling control as to degree received in each unit and as to the ultimate result.

Rotor speeds will vary from 600 r.p.m. for a 6-inch over-all diameter rotor to as slow as 200 r.p.m. for a 24-inch rotor. Normal rotor lengths are usually based on a diameter to length ratio of from 1 to 5 up to 1 to 10, but may be varied without departing from the intent and principles of this invention.

Circulation of an extractive solvent during the milling operation is a function of this apparatus. Solvent flow may be concurrent, countercurrent or mixed flow in any series of two or more units. If extraction obtained in this apparatus will be supplemented by subsequent processing steps in other apparatus, concurrent solvent flow is normally the most convenient. In such instance, couplings 3a and 4 of the second unit are closed by pipe plugs (not shown), and solvent may be introduced in concurrent flow with the rice through pipe coupling 3 on the top unit, when it will travel in annulus 20 and also pass through perforated screen 21 and wet the rice. The solvent will pass through a pipe 4b attached to pipe couplings 4a and 3 and enter the second unit in series through its pipe coupling 3 and discharge through pipe coupling 4a into pipe 4c and enter pipe coupling 3 of the third unit in series. It will finally discharge through pipe coupling 4a of the third unit to other apparatus. Some of the solvent also travels with the rice through sections A1, A2 and A3 of each unit and finally discharges through chute 2c of the final unit into other apparatus.

Solvent in countercurrent flow can enter pipe coupling 4a of the lowest unit in series and follows exactly the reverse course above described for concurrent flow. If the countercurrent, downward flow of milled grain leaving discharge chute 2c of the final unit enters a subsequent apparatus which maintains a solvent level at approximately the elevation of pipe coupling 3 in the upper unit, the entire solvent flow inclusive of that within the interior of sections A1, A2 and A3 of each unit in the series will be countercurrent, upward flow through the entire apparatus assembly. Such system is described in applicant's copending application Serial No. 43,351 and illustrated in FIG. 1 of that applications; also in copending application Serial No. 81,969, FIG. 2.

If the grain milling products and the solvent in direct contact with same discharge from the final chute 2c of the last unit in series under conditions which do not provide an unbroken solvent level such as above described, there will be mixed flow of solvent, i.e., some of it will be forced rapidly upward through annulus 20 of each unit by means of a suitable pump and be discharged through pipe coupling 3 of the upper unit, while a part of the solvent will follow a downward path with the milled grain products.

The above-described apparatus is adapted to use in the combination solvent extraction and wet milling process for brown rice described in applicant's co-pending application Serial Number 43, 351 in accordance with the process flow diagram illustrated in FIG. 1 of that application. A suitable modification of this apparatus which is adapted to a semi-wet milling process that does not involve solvent extraction is also illustrated in the above-identified co-pending application in the flow diagram of FIG. 2. A second modification of the apparatus described herein is suitable for either semi-wet or dry milling. This embodiment involves only the substitution of induced or forced draft drying and collecting air into the apparatus to carry off the millings instead of a liquid solvent. This modification requires only the enlargement of the annulus 20 and pipe couplings 3, 3a, 4 and 4a to introduce sufficient air at pressures above atmospheric to entrain and carry off the millings to a suitable collector. Since air will not travel countercurrently through the connected units as efficiently as will a solvent, collecting and drying air is preferably introduced separately into each unit comprising the assembly, but the exhausted millings may either be separately collected or manifolded into one main supply duct to the collector. The air stream may be concurrent or countercurrent to the travel of the grain.

Materials of construction may comprise any metal which can be punched, rolled, formed and otherwise subjected to fabricating operations, and may range from mild steel to high alloy steel and non-ferrous metals. The choice of metals is determined by the processing requirements and the quality specifications for the finished grain, bran and extracted oils. Usually where light colored oils which will give maximum yields on refining are desired, ordinary steel construction is superseded by stainless steel or non-ferrous alloys.

It is to be understood that the principles of this invention may be utilized for the surface milling and/or solvent extraction of products other than rice and other cereal and oil-bearing seeds.

The applicant has in the drawings and specification presented a detailed disclosure of an embodiment of the invention, but it is to be understood that as the invention and the mechanical features are susceptible of modifications, structural changes, the use of alternate devices as components of the whole apparatus and various applications of use within the spirit and scope of the invention, he does not intend to limit the invention to the specific form disclosed but intends to cover all modifications, changes and alternate constructions and methods falling within the scope of the principles taught herein, and as specified in the claims.

The invention having been described, what is claimed is:

1. Apparatus for milling cereal grains of the class of rice and barley comprising a series of units, each unit including a horizontal, elongate, cylindrical screen having openings therethrough closely spaced from each other substantially throughout its area, said openings being of such size as to pass bran and to retain kernels of grain, a cylindrical rotor within and concentric with the screen defining an annular space between the screen and rotor, an inlet for grain into said annular space adjacent one end of the screen, an outlet for grain from said annular space adjacent an opposite end of the screen, and helical flights on the rotor constructed to direct grain against said screen and to advance grain toward the outlet, said helical flights being arranged in successive groups on the rotor with the flights in each group substantially equally spaced from each other, extending from 45° to 180° of the rotor circumference and having a pitch: diameter ratio of 1:1 to 4:1; means, cooperative with each preceding and succeeding unit in the series, for conveying grain from the outlet of the preceding unit to the inlet of the succeeding unit; and means, operatively connected to drive the rotors, said drive means and helical flights in a succeeding unit being cooperative to exert back pressure on grain in a preceding unit.

2. Apparatus for milling cereal grains of the class of rice and barley comprising a series of units, each unit including a horizontal, elongate, cylindrical screen having openings therethrough closely spaced from each other substantially throughout the area of the screen, said openings being of such size as to pass bran and to retain kernels of grain, a cylindrical rotor within and concentric with the screen defining an annular space between the screen and rotor, an inlet for grain into said annular space adjacent one end of the screen, an outlet for grain from said annular space adjacent an opposite end of the screen, and helical flights on the rotor constructed to direct grain against said screen and to advance grain toward the outlet, said helical flights being arranged in a series of successive groups on said rotor, the flights in each group being equally spaced from and parallel to each other, extending from 45° to 180° of the rotor circumference, having a pitch: diameter ratio in the range from 1:1 to 4:1 and the flights in each preceding group extending through a circumferential arc overlapping about ½ a circumferential arc covered by a corresponding helical flight in a succeeding group; means, cooperative with each preceding and succeeding unit in the series, for conveying grain from the outlet of the preceding unit to the inlet of the succeeding unit; and means, operatively connected to drive the rotors, said drive means and helical flights in a succeeding unit being cooperative to exert back pressure on grain in a preceding unit.

3. The apparatus of claim 2 wherein the drive means includes members arranged to drive a succeeding unit at lesser speed than a preceding unit.

4. Apparatus for milling cereal grains of the class of rice and barley comprising a series of units, each unit including a horizontal, elongate, cylindrical screen having openings therethrough substantially throughout its area, said openings being of such size as to pass bran and to retain kernels of grain, a rotor within and concentric with the screen defining an annular space between the screen and rotor, an inlet for grain into said annular space adjacent one end of the screen, an outlet for grain from said annular space adjacent an opposite end of the screen, and helical flights on the rotor constructed to direct grain against said screen and to advance grain toward the outlet; means, cooperative with each preceding and succeeding unit in the series, for conveying grain from the outlet of the preceding unit to the inlet of the succeeding unit; means, operatively connected to drive the rotors, said drive means and helical flights in a succeeding unit being cooperative to exert back pressure on grain in a preceding unit; and means including a housing surrounding each screen in each unit, for passing a stream of liquid along said screen in contact with grain advancing therethrough.

5. The apparatus of claim 4 wherein the drive means include members arranged to drive a succeeding unit at lesser speed than the preceding unit.

6. The apparatus of claim 4 wherein the helical flights on the rotor are arranged in successive groups, with the flights in each group substantially equally spaced from each other extending from 45° to 180° of the rotor circumference and having a pitch to diameter ratio of 1:1 to 4:1.

7. The apparatus of claim 4 wherein openings in the screen are oblong, have a width in the range from 0.024 inch to 0.049 inch, a length in the range from ⅛ to ½ inch.

8. The apparatus of claim 4 wherein each unit includes a helical supporting member attached to the housing rigidly supporting the screen and providing a helical path for flow of liquid between the screen and housing.

References Cited by the Examiner

UNITED STATES PATENTS

| | | | |
|---|---|---|---|
| 272,205 | 2/1883 | Burkholder | 146—287 X |
| 415,275 | 11/1889 | Kehlor | 146—287 X |

J. SPENCER OVERHOLSER, *Primary Examiner.*